United States Patent [19]

Ross et al.

[11] Patent Number: 4,588,996

[45] Date of Patent: May 13, 1986

[54] THERMAL RIBBON CARTRIDGE TRANSPORT IN A POSTAGE METER THERMAL PRINTER

[75] Inventors: William A. Ross, Darien; Kenneth A. Terry, Fairfield, both of Conn.

[73] Assignee: Pitney Bowes Inc., Stamford, Conn.

[21] Appl. No.: 622,035

[22] Filed: Jun. 19, 1984

[51] Int. Cl.⁴ ........................ G01D 15/10; B41J 15/00; G06F 1/106

[52] U.S. Cl. ................................ 346/76 PH; 235/101; 400/120

[58] Field of Search .................... 346/76 PH; 235/101; 358/296; 400/120, 235.1

[56] References Cited

U.S. PATENT DOCUMENTS

| | | | |
|---|---|---|---|
| 3,938,095 | 2/1976 | Check, Jr. et al. | 340/172.5 X |
| 4,343,837 | 8/1982 | De Lorenzo | 427/275 X |
| 4,437,778 | 3/1984 | Miyashita et al. | 400/208 X |
| 4,453,167 | 6/1984 | Motoyoshi | 346/76 PH |
| 4,460,676 | 7/1984 | Fabel | 430/333 X |
| 4,480,933 | 11/1984 | Shibayama et al. | 400/120 X |

*Primary Examiner*—E. A. Goldberg
*Assistant Examiner*—Gerald E. Preston
*Attorney, Agent, or Firm*—Michael J. DeSha; William D. Soltow, Jr.; Albert W. Scribner

[57] ABSTRACT

A postage meter which includes a thermal print head for printing indicia, postal value, and the like is disclosed. In accordance with the invention, thermal elements in the thermal print head are electronically pulsed in appropriate serially time patters to provide a complete thermally transferred image on a strip moving past the thermal head. A reversible stepper motor and cam arrangement are utilized to provide a drive mechanism and a means for relieving pressure on the strip at the end of each print cycle. With the pressure relieved, a particularly simplified loading of a thermal ribbon cassette may be effected.

1 Claim, 3 Drawing Figures

THERMAL RIBBON CARTRIDGE TRANSPORT IN A POSTAGE METER THERMAL PRINTER

BACKGROUND OF THE INVENTION

The present invention relates to postage meters and particularly to a postage meter in which variable data can be easily printed along with the imprint of postal value.

Previously, electronic meters, as well as the more traditional mechanical postage meters have relied upon specifically-manufactured, individually-unique printing dies which were provided to the user and which enabled the printing of the indicia, slogans, and the like in addition to postal value. Once fixed, the information and images replicated by the die could not be changed except by replacing the die.

SUMMARY OF THE INVENTION

In accordance with the invention the printing of postal value and other associated indicia is accomplished by using a thermal transfer printer under the control of a microprocessor for forming the images and enabling the input and printing of selected variable data. Thus it is an object of the invention to provide a postage meter which is capable of printing different information on a tape or strip in accordance with a received command.

It is a further object to provide a stamp impression printer to provide printing of changeable indicia without changing any mechanical parts.

It is another object to provide a means for interchanging meters, particularly between post offices, without having to order new printing dies.

It is further desirable to avoid cutting the paper tape while the tape is moving or while printing is in process. It is therefore an object to provide an apparatus which will cut a strip prior to printing the variable data thereon.

DETAILED DESCRIPTION OF THE PREFERRED EMBODIMENT

Figure 1:
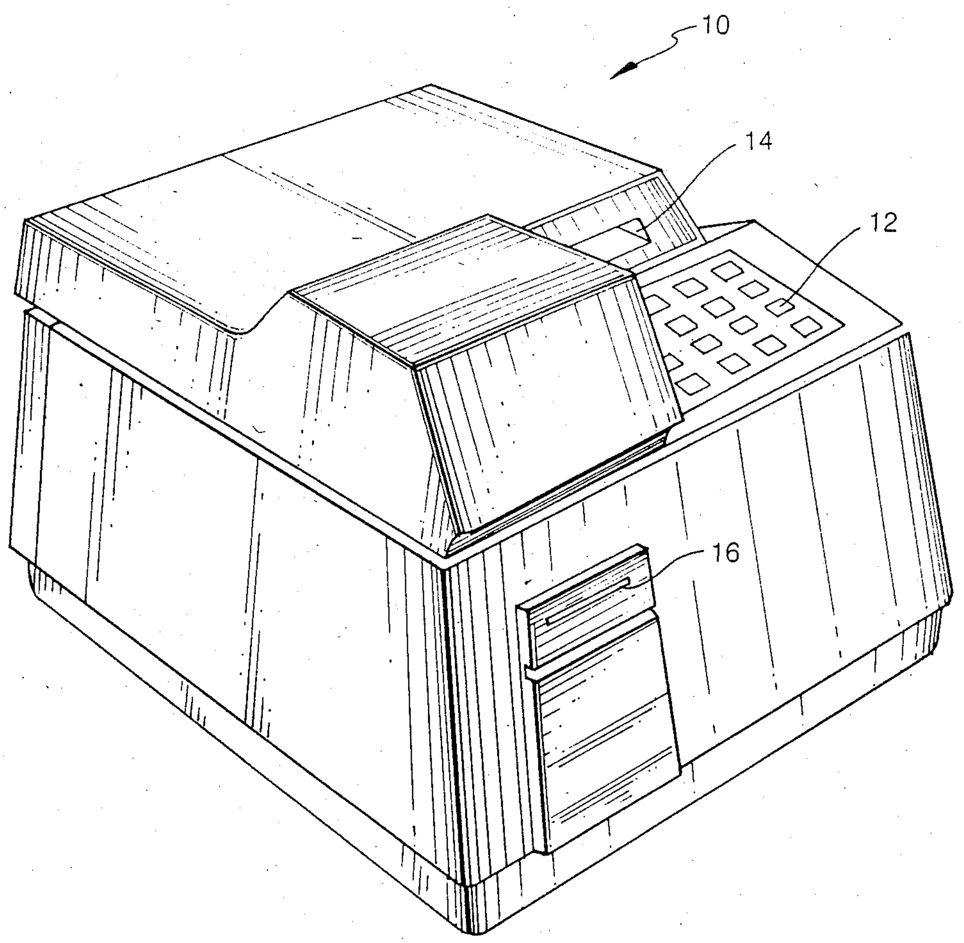
FIG. 1 is a perspective drawing of a postage meter in accordance with the invention.

In FIG. 1, a postage meter in accordance with the invention is shown generally at 10. The unit is provided with a keyboard 12 for inputting data into the unit and a display 14 which may be a conventional LED display. Similar keyboards and displays are shown and described in U.S. Pat. No. 3,938,095 to Check, Jr. et al, the disclosure of which is incorporated by reference. A slot or opening 16 is provided through which is ejected the imprinted tape. An input/output connector (not shown) may be optionally provided if desired for interconnection and communication with other devices.

Figure 2:
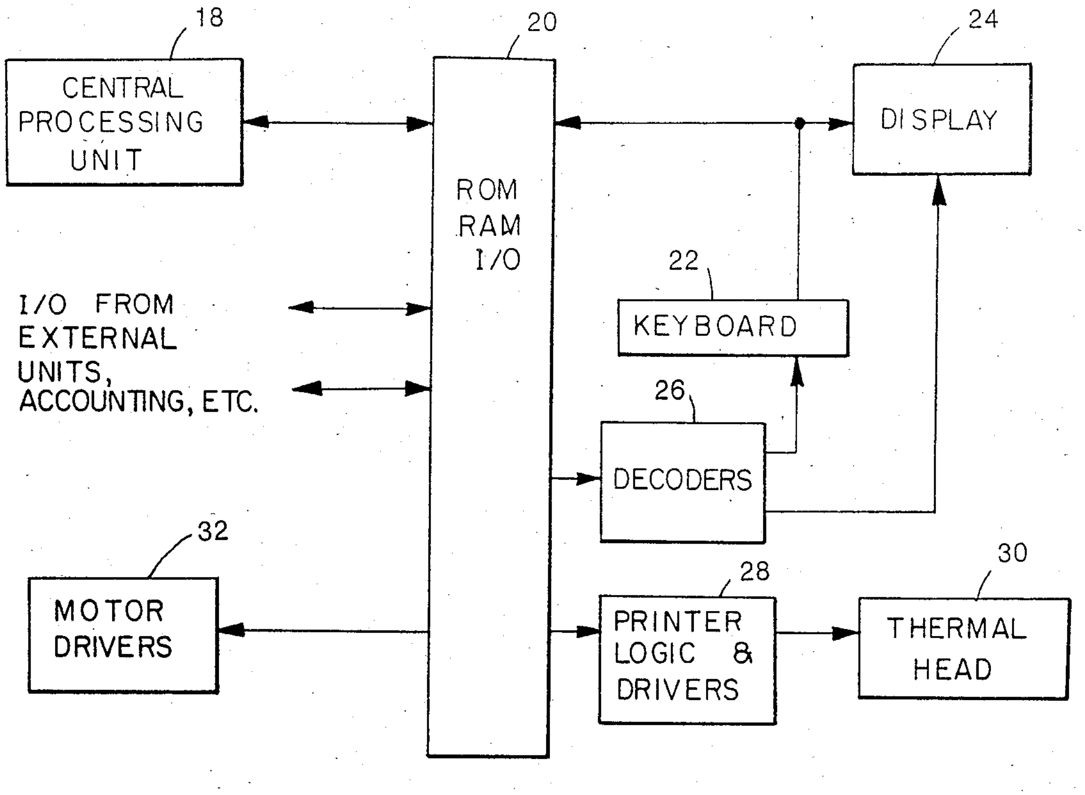
FIG. 2 is a block diagram of the electronic portion of the meter in accordance with the invention.

FIG. 2 is a block diagram of the electronic portion of the postage meter in accordance with the invention. The meter preferably incorporates a central processing unit 18 connected through a conventional bus arrangement to a multi-purpose ROM/RAM/IO device 20. A keyboard 22 and display 24 are scanned and driven, respectively, in conventional manner through use of conventional decoders 26 to enable input and readout of desired data. A bus arrangement likewise preferably provides in conventional manner for input and output between ROM/RAM/IO device 20 and accounting registers, peripheral units, or the like.

Printer logic and driver circuits shown at 28 receive data input from the device 20 and translate the data into a pattern of suitable sequential electrical pulses to individual thermal heating elements of a thermal print head 30 for heating the elements in conventional fashion. Suitable thermal print heads for use in a meter as disclosed herein are available from RICOH Company Ltd., San Jose, Calif. or KYOCERA Company, Kyoto, Japan. A typical device is shown and described in U.S. Pat. No. 4,429,318 issued Jan. 31, 1984 to Kobata.

In the print head for use in the instant postage meter it is preferable that the heating elements be formed in a single row and arranged perpendicular to the direction of travel of a paper tape as described below. For best results, there are about 224 elements in the row. The elements are heated as required for the purpose of melting an ink composition on a thermal transfer ribbon and causing it to be lifted off the ribbon at the point of heating and transferred to a paper tape traveling in conjunction with the thermal transfer ribbon. CPU 18 further controls the sequencing of motor drivers 32 which is described in connection with FIG. 3.

Figure 3:
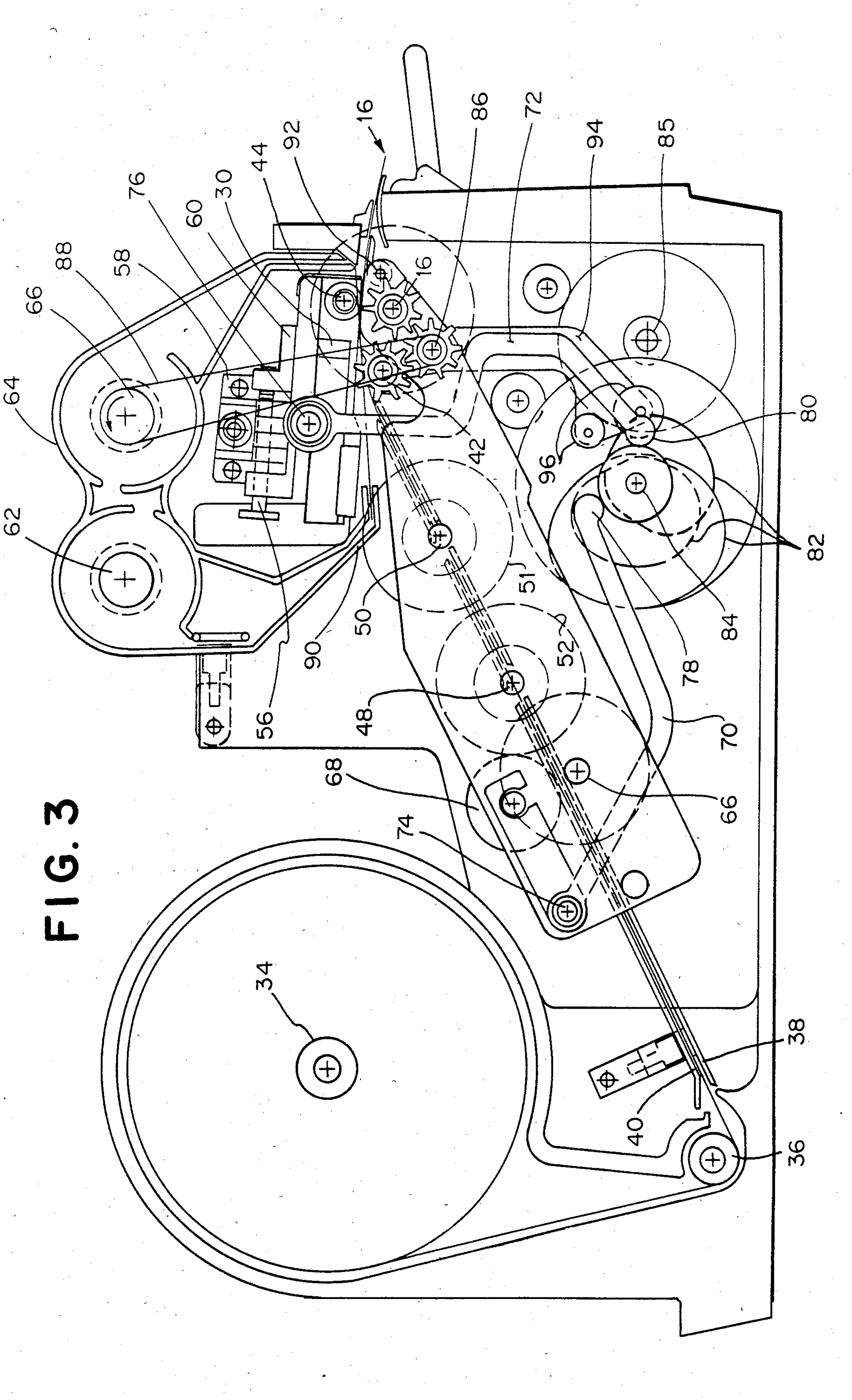
FIG. 3 shows a preferred tape and thermal transfer ribbon drive apparatus for the meter in accordance with the invention.

Referring now to FIG. 3, there is shown a suitable tape drive unit for the postage meter. Paper tape (not shown) spools off a roll of tape rotatably mounted on shaft 34 passing around roller 36 and between tape guides 38 and 40 and from thence portions of tape feed into the bite between heating elements of the thermal head 30 (numbered the same as the block shown in FIG. 2) and the impression roller indicated at 42 to the bite between upper exit roller 44 and lower exit roller 46. Tape cutting knives 48 and 50 are provided for cutting the tape into one of two different lengths depending upon whether a printed slogan or other such information is desired or not. Each knife 48 and 50 comprises a movable cutting blade in contact with a rotationally biased blade operated preferably by means of a rotary solenoid (shown schematically at 52 and 54) which operate upon command of the microcomputer to cut the tape prior to transport of a cut section past the thermal head 30.

It has been found desirable to avoid cutting the paper strip as the strip is moving and the printing is in process. Cutting while the tape is stopped aids in the avoidance of paper jams at the knife and simplifies timing and mechanical complexity of the knife mechanism. It also avoids any possible distortion of the thermal transfer printing which might be caused by the paper strip hesitating during the cutting action.

Typically, the knife must usually be located a significant distance either upstream or downstream of the area of printing. Thus, normally a non-printable border will be present at either the leading or the trailing edge of the printed strip if the strip is cut after printing takes place unless the strip is retracted. Such a border is avoided and any retraction mechanism is avoided by situating the knives as shown in FIG. 3 and by cutting the tape before printing takes place.

The thermal head 30 is able to both translate and rotate so as to align the row of heating elements with the impression roller nip. Suitable adjustment means, for example, are shown as threaded screw 56 threadingly mounted on bracket 58 and carrying mounting member 60 to which the thermal head 30 is fixed.

A roll of thermal transfer ribbon (not shown), typically 0.00025" Mylar® ribbon having a suitable meltable ink composition coating, is rotatably mounted on shaft 62 and preferably housed in a molded cassette housing 64. The tape is threaded coating side down so as to travel adjacent to the paper tape through the bite between the thermal head 30 and the impression roller 42 and then through the bite between the exit rollers to a take-up spool mounted on shaft 66, also preferably a part of cassette 64.

Drive or feed roller 66 and pinch roller 68 are provided to advance tape to the position for the next cycle as described more fully in a copending application of William Ross and Kenneth Terry entitled TAPE STRIP CUTTER IN A POSTAGE METER HAVING A THERMAL PRINT HEAD filed on even date herewith, and assigned to Pitney Bowes Inc.

Under conditions of high humidity, gummed paper tape may in time adhere to the rollers if the tape stays in position under pressure for long lengths of time. This may cause jamming of the paper strip on start up and during rotation of the drive rollers. To avoid problems with such sticking, in accordance with the invention, the rollers are made to retract from the paper strip at the conclusion of each printing cycle. To achieve this result, arms 70, 72 and 94 are pivoted about pivot shafts 74, 76 and 86. The distal ends 78, 80 and 96 of these arms are normally made to rest against camming surfaces 82 fixed on shaft 84. The camming surface is arranged such that upon rotation in one direction, the ends 78, 80 and 96 move inwardly toward the shaft 84 as pinch roller 68, impression roller 42 and upper exit roller 44 are driven by springs (not shown) into pressure abutment against the feed roller, the thermal head and the lower exit roller. Upon rotation in the opposite direction, the camming surface causes the distal ends to move outwardly which again causes the pinch roller 68 and the impression roller 42 to move away from the tape to relieve the pressure thereon.

The positioning of the upper exit roller 44 away from the tape enables a very simplified loading of the cartridge and threading of the ribbon so as to avoid any need to touch the ribbon or to feed it around any rollers or guides. As brought out above, at the end of each machine cycle the rollers are automatically moved out of contact with the thermal print head and the lower exit roller. The ribbon bridging the distance between guides 90 and 92 is easily inserted into the large gap existing between the thermal head and the impression roller and the bite between the exit rollers when the rollers are in this condition.

Preferably, feed roller 66, impression roller 42, and exit roller 46 are driven from a single reversible stepping motor (not shown) located at drive shaft 85. For best results, the lower exit roller 46 is driven by a drive belt from the stepping motor and lower exit roller 46 drives an idler wheel 86 which in turn drives the impression roller 42. Suitably, belt 88 transmits the motion from idler wheel 86 to the take-up spool mounted on shaft 66.

In accordance with the invention, the reversible stepping motor is geared in a one-to-one ratio with the shaft 84 which carries both the camming surfaces 82 and the timing belt pulley. One or the other of these will be driven by shaft 84, depending on the direction of rotation through suitable overrunning clutches. When the stepping motor turns in a first direction, the clutch arrangement transmits the motion to the camming surfaces 82 for movement of the distal ends of the arms 70, 72 and 94. At the same time, the over-running clutch will not transmit any motion through the belt drive. Conversely, when the motor turns in the opposite direction, the motion is transmitted through the belt drive for driving the feed roller, impression roller, and exit rollers.

The operation of the drive mechanism will now be described assuming that the paper tape is loaded such that it lies between guides 38 and 40 and the free end is situated approximately at the bite between the thermal head 30 and the impression roller 42. It is also assumed that the pinch roller 68, the impression roller 42 and the upper exit roller 44 are in the pressure-relief position away from the tape.

As the printing operation commences, the camming surface 82 is rotated so as to enable the arms 70, 72 and 94 to move inwardly toward shaft 84 to in turn bring the pinch roller 68 and impression roller 42 into pressure abutment against the paper tape. With the rollers in such abutment, one of the knives 48 or 50 is actuated under command of the microprocessor depending upon the length of the meter strip desired, that is, whether a slogan or the like is desired. The drive rollers are then actuated to drive the cut segment of tape past the thermal print head and through the bite of the exit rollers 44 and 46 and from thence out the slot 16. At the same time, feed roller 66 is driving the remaining tape into pre-position for the next printing cycle.

As the tape is traveling past the thermal head, the thermal transfer ribbon is also traveling in conjunction with the tape. In response to output commands from the microcomputer, the thermal elements of the thermal head are heated in a patterned sequence to create the desired image line-by-line on the tape traveling past the head as the ink coating on the thermal transfer ribbon is heated and lifted from the thermal transfer ribbon and deposited on the paper tape.

When the printing has finished and the tape has been pre-positioned for the next cycle, pressure is then relieved on the feed roller and the impression roller by the rotation of the camming surface 82 into its initial position to again lift pinch roller 68 and to pivot impression roller 42 away from the paper tape.

It will be understood that the claims are intended to cover all changes and modifications of the disclosed embodiment, herein chosen for the purpose of illustration, which do not constitute departures from the scope and spirit of the invention.

What is claimed is:

1. In an electronic postage meter of the type including accounting means and means for inputting postal data, the improvement comprising thermal printing means for printing postal value along with other indicia, said printing means including:

(a) a thermal print head which includes a plurality of thermal heating elements operative to receive voltage pulses for heating thereof to a predetermined temperature;

(b) a tape drive means for moving an impression receiving tape past the individual elements of the print head during a print cycle;

(c) a thermal transfer ribbon transportation means, said transportation means including a removable cassette including a housing for holding spools of thermal transfer ribbon, means for driving one of said spools for taking up said transfer ribbon, said tape drive means including movable drive rollers, said drive rollers being positioned at a first position during the print cycle for driving said tape and at the end of each said print cycle said drive rollers being moved into a position wherein said transfer ribbon may be easily threaded into position adjacent to the thermal head.

* * * * *